March 18, 1930. L. D. SOUBIER 1,750,971
METHOD AND APPARATUS FOR PRODUCING TUBULAR GLASS
Filed Oct. 16, 1926
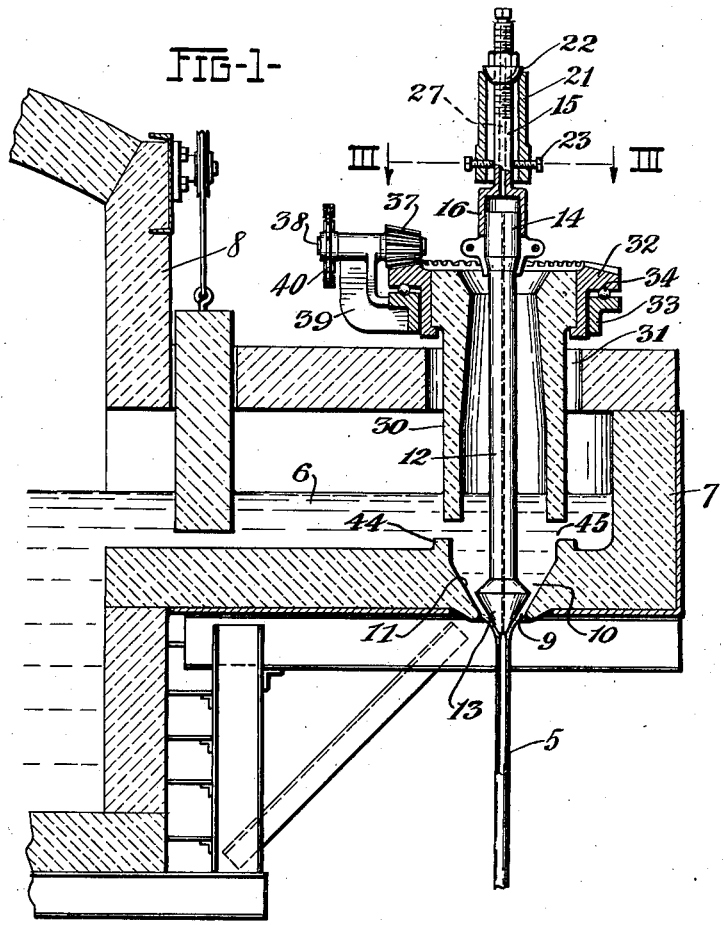
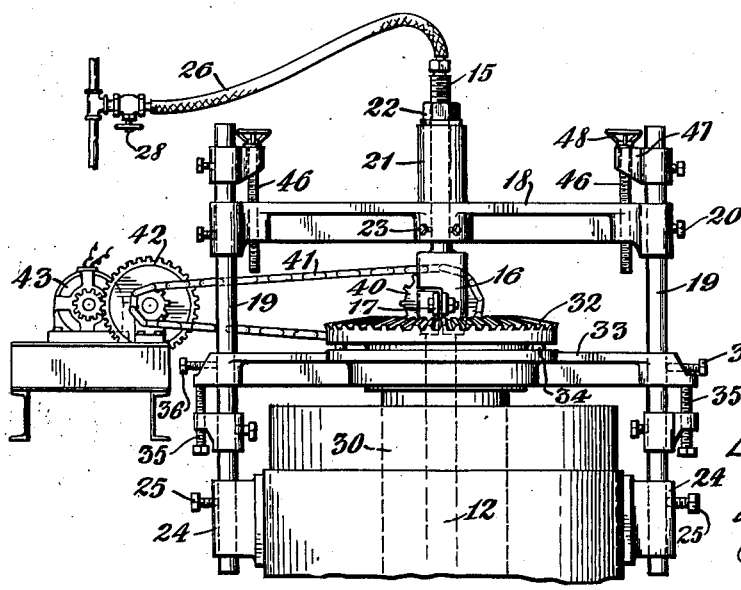
INVENTOR
Leonard D. Soubier.
by J. F. Rule
HIS ATTY.

Patented Mar. 18, 1930

1,750,971

UNITED STATES PATENT OFFICE

LEONARD D. SOUBIER, OF TOLEDO, OHIO, ASSIGNOR TO OWENS-ILLINOIS GLASS COMPANY, OF TOLEDO, OHIO, A CORPORATION OF OHIO

METHOD AND APPARATUS FOR PRODUCING TUBULAR GLASS

Application filed October 16, 1926. Serial No. 141,915.

My invention relates to an improved method and apparatus for forming tubular glass by a continuous drawing process. The invention as herein disclosed is embodied in an apparatus comprising a container for molten glass having a bottom outlet into which projects a stationary mandrel forming with the outlet an annular passageway through which the glass issues. Within the supply body of glass there is provided stirring means by which a uniform distribution of glass is maintained at the outlet and one sided cooling prevented.

In Patent Number 1,571,216, granted to me February 2, 1926, is disclosed a tube drawing apparatus of this same general type in which the mandrel is rotated to maintain a proper circulation of the glass and even temperature distribution.

An object of the present invention is to provide an improvement in which the mandrel is held stationary so that the walls of the annular forming die, comprising the opposite walls of the mandrel and outlet opening, are stationary, such construction embodying substantial advantages over one in which the mandrel is rotated. I have found, however, that with a stationary mandrel there is an uneven distribution of the issuing glass and a tendency for the flow to establish itself mainly at one side of the mandrel, unless special provision is made for correcting this tendency. This difficulty is overcome in the present invention by providing, in combination with the stationary mandrel, suitable means for maintaining a rotary circulation of glass around the axis of the outlet, thereby securing uniformity of temperature and equal rate of flow at all points in the circumference of the outlet, whereby a uniform distribution of glass in the walls of the tube which is being drawn, is maintained.

Other objects of the invention will appear hereinafter.

In the accompanying drawings:

Figure 1 is a sectional side elevation of an apparatus constructed in accordance with my invention.

Figure 2 is a front elevation of the same.

Figure 3 is a fragmentary sectional view at the line III—III on Figure 1.

The glass is continuously drawn in the form of a tube or cane 5 by suitable mechanism (not shown), as it issues from a supply body 6 of molten glass within a container 7, herein shown as a forehearth or extension of the furnace 8. The glass issues from the container through an annular orifice or outlet opening 9 at the bottom of a well 10 formed in the floor of the container. The walls 11 of the well are tapered or downwardly convergent.

Projecting vertically downward through the glass in the container is a mandrel comprising a stem 12 having at its lower end a conical or frusto-conical head 13. The conical surface of the head 13 is substantially parallel with the tapered walls 11, the opposite walls of said head and well forming an annular tapered passageway leading to the orifice 9 through which the glass issues. The head 13, as shown, projects a substantial distance below the outlet and provides a convergent shaping surface over which the glass flows and from the lower edge of which the glass is drawn in tubular form.

The stem 12 of the mandrel is provided at its upper end with a head or enlargement 14 by which it is attached to a screw threaded rod 15 forming a vertical extension of the mandrel. The lower end of the rod 15 is formed with a cylindrical socket 16 to receive and form an airtight connection with the head 14 which is secured therein by a clamp 17. The mandrel is supported in a yoke 18 mounted on vertical standards 19. The yoke is adjustable vertically on the standards and held in adjusted position by set screws 20. Provision is also made by which a nice vertical adjustment of the yoke and mandrel may be made while the apparatus is in operation. For this purpose, adjusting rods 46 are provided. These rods are supported in bearing brackets 47 and have screw threaded connections with the yoke 18. By rotating hand wheels 48 attached to the rods, the yoke can be adjusted up or down and then secured in adjusted position by the set screws 20.

The stem 15 is provided with screw threads and projects upwardly through a bearing sleeve 21 formed in and projecting upwardly from the yoke 18. A nut 22 threaded on the stem 15, bears on the upper end of the sleeve 21 and provides a pivotal support for the mandrel, permitting lateral adjustment of the mandrel, which may be effected without interfering with the normal operation of the tube drawing apparatus. Adjusting nuts 23 provide a means for effecting such adjustment laterally in any direction for accurately centering the head 13 within the outlet opening and for holding it in adjusted position. The nut 22 is provided with a spherical bearing surface to facilitate such lateral adjustment.

The standards 19 are supported in bearing sleeves 24 on the framework which supports the container 7 and are secured therein by set screws 25.

Air may be supplied in the usual manner to the interior of the tube 5 as the latter is being drawn. This air is supplied through a hose 26 connected to the upper end of the rod 15, the mandrel being provided with a central passageway 27 through which said air is conducted to the tube 5. A valve 28 permits the supply of air to be regulated or cut off.

It has been found that with a stationary mandrel there is an unequal cooling of the glass at different points circumferentially of the mandrel, resulting in a decided tendency for the glass to draw off at one side of the mandrel, either preventing a tubular formation or resulting in a glass tube having the walls thicker at one side than the other. To overcome this difficulty and secure a uniform temperature and distribution of the glass so that the walls of the tube are of uniform thickness throughout their circumference, there is provided suitable means for maintaining a continuous rotary circulation of the glass around the mandrel. Such means comprises a hollow cylindrical stirring member or tube 30 projecting downward through an opening 31 in the top of the container 7, the lower end of said tube extending into the glass. Attached to the upper end of the stirring device 30 is an annular bevel gear 32 supported on a yoke 33. Bearing balls 34 may be interposed between the gear and the yoke. Said yoke is mounted on the standards 19 and may be adjusted vertically thereon by means of adjusting screws 35 and secured in adjusted position by set screws 36. Meshing with the gear 32 is a pinion 37 carried on a shaft 38 mounted in a bearing bracket 39 formed on the yoke 33. A sprocket wheel 40 on the shaft 38 has a driving connection through a sprocket chain 41 and gearing 42 to an electric motor 43, by which the stirring device 30 is continuously rotated. Between the lower end of the tube 30 and the floor of the container, or an annular projection 44 of said floor, is an annular passageway 45 through which the glass enters the well 10. The continuous rotation of the tube 30 maintains a continuous rotary circulation of the glass within the well so that as it issues through the annular outlet 9, it is homogeneous and of even temperature Modifications may be resorted to within the spirit and scope of my invention.

What I claim is:

1. The process of producing glass in tubular form which comprises causing glass to issue at a constant rate from a molten supply body through an annular passageway defined by stationary walls, and maintaining a rotary circulation of glass in the supply body around the axis of the said passageway.

2. The method of forming tubular glass which comprises causing the glass to issue from a supply body of molten glass through an annular bottom outlet having stationary walls, continuously drawing the issuing glass by a force applied externally of the outlet, and maintaining a rotary circulation of the glass in the supply body.

3. The method of forming tubular glass which comprises causing the glass to issue from a supply body of molten glass through an annular bottom outlet having stationary walls, continuously drawing the issuing glass by a force applied externally of the outlet, maintaining a rotary circulation of the glass in the supply body about the axis of the outlet, and supplying air downwardly through the supply body and into the issuing glass to give to the issued glass a hollow tubular form.

4. The combination of a container for molten glass, means providing an annular outlet opening through which the glass issues from the container in tubular form, said outlet having its inner and outer walls stationary, and means to maintain a rotary circulation of the glass within the container about the axis of said outlet.

5. The combination of a container for molten glass, means providing an annular outlet opening through which the glass issues from the container in tubular form, said outlet having its inner and outer walls stationary, a stirring tool projecting into the glass, and means for rotating said tool about the axis of the outlet.

6. The combination of a container for molten glass having a bottom outlet opening, a stationary mandrel projecting downward into said opening and forming therewith an annular passageway, and means for rotating the glass in the container about the axis of said opening.

7. The combination of a container for molten glass having a bottom outlet opening, a stationary mandrel projecting downward into said opening and forming therewith an annular passageway, said mandrel having its lower end tapered and projecting downward below the outlet opening, and means for rotating the glass in the container about the axis of said opening.

8. The combination of a container for molten glass, said container having a well formed in the floor thereof, the lower end of said well terminating in a bottom outlet opening, a stationary mandrel projecting downward into said well and forming therewith an annular passageway through which the glass issues, and a stirring implement projecting into the glass above said well and rotatable about the axis of the well to cause a rotary circulation of the glass entering the well.

9. The combination of a container for molten glass, said container having a well formed in the floor thereof, the lower end of said well terminating in a bottom outlet opening, a stationary mandrel projecting downward into said well and forming therewith an annular passageway through which the glass issues, and a stirring implement projecting into the glass above said well and rotatable about the axis of the well to cause a rotary circulation of the glass entering the well, the walls of said well and the opposite walls of the mandrel being downwardly and inwardly convergent or tapered and substantially parallel to provide an annular tapered passageway leading to the outlet.

10. The combination of a container for molten glass having a bottom outlet opening in the floor thereof, a stationary mandrel projecting downwardly into said opening and forming therewith an annular passageway through which the glass issues, a stirring tube surrounding said mandrel and projecting downward into the glass into proximity to the floor of the container to provide an annular passageway through which the glass flows from the supply body to the outlet, and mechanism for continuously rotating said tube.

11. The combination of a container for molten glass having a bottom outlet, a mandrel extending into said outlet and comprising a vertical stem extending above the container, a support in which said stem is mounted, and means for universally adjusting the stem laterally in any direction comprising adjusting screws mounted in said support and engaging said stem.

12. The combination of a container for molten glass having a bottom outlet, an implement projecting into the glass to control the discharge through said outlet, said implement comprising a stem extending vertically above the container, an adjusting nut threaded on said stem, a stationary support on which said nut rests, and means for adjusting said implement laterally, comprising adjusting screws threaded into said support and engaging said stem.

13. The combination of a container for molten glass having a bottom outlet opening in the floor thereof, a stationary mandrel projecting downwardly into the opening and forming therewith an annular passageway thru which the glass issues, a stirring tube surrounding said mandrel and projecting downwardly into the glass in proximity to the floor of the container to provide an annular passageway thru which the glass flows from the supply body to said outlet, and means to effect a relative rotation of the tube and container.

Signed at Toledo, in the county of Lucas and State of Ohio, this 14th day of October, 1926.

LEONARD D. SOUBIER.